March 8, 1927.

G. N. HUGHES 1,620,551

FRUIT JUICE EXTRACTING MACHINE

Filed Aug. 3. 1925

WITNESSES

INVENTOR
G. N. Hughes,
BY
ATTORNEYS

March 8, 1927.
G. N. HUGHES
FRUIT JUICE EXTRACTING MACHINE
Filed Aug. 3, 1925
1,620,551
6 Sheets-Sheet 2
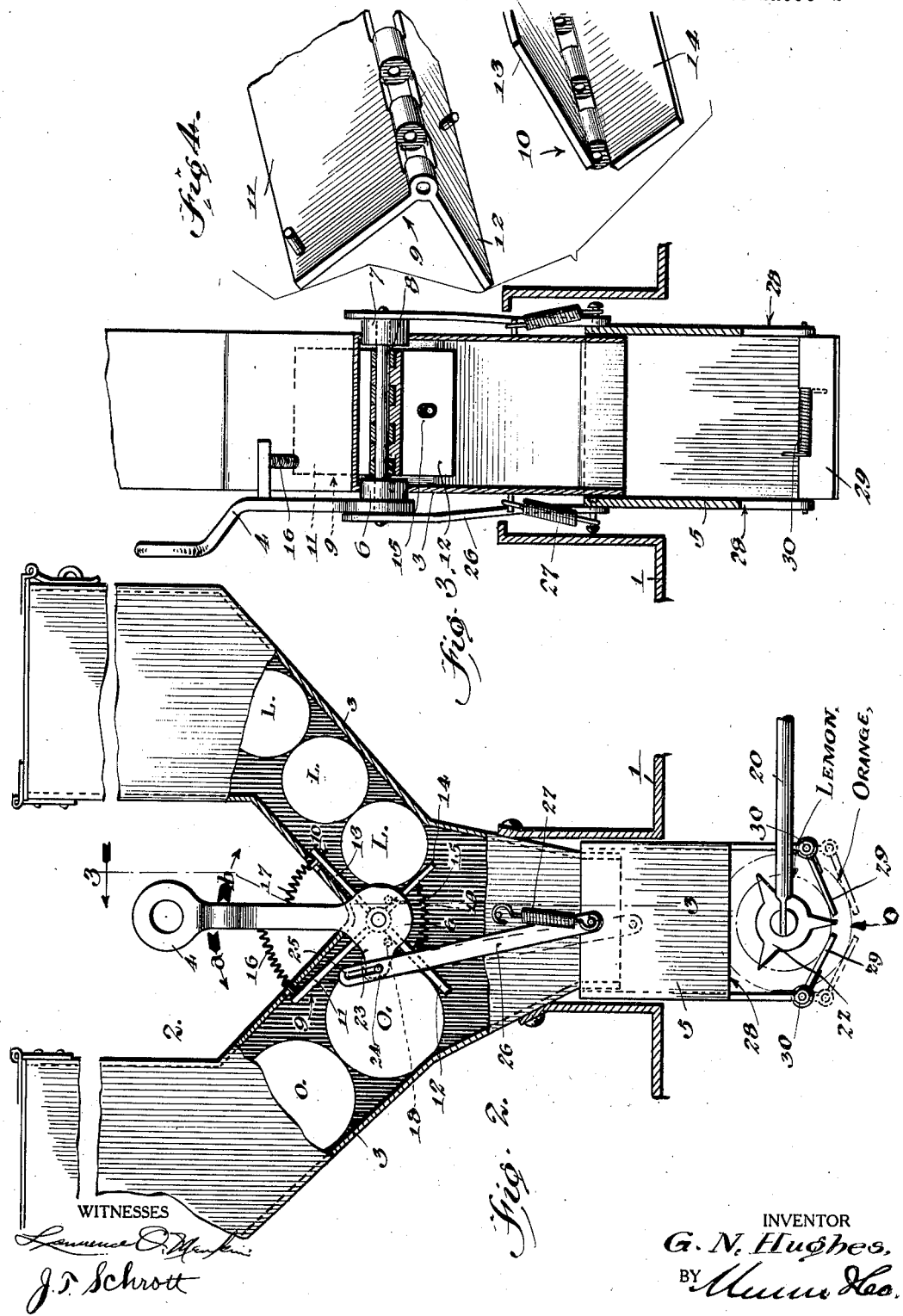
INVENTOR
G. N. Hughes,
BY
ATTORNEYS

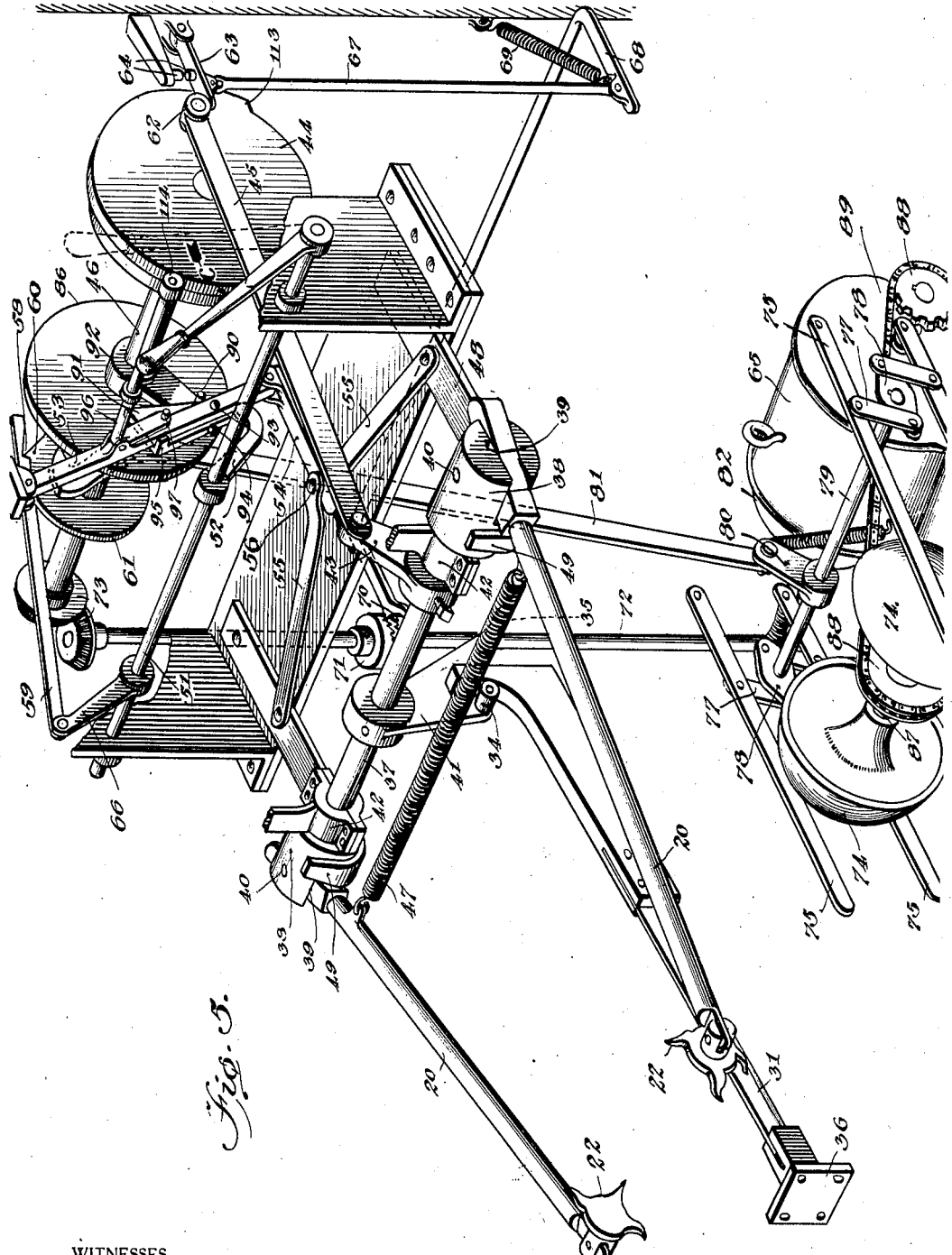

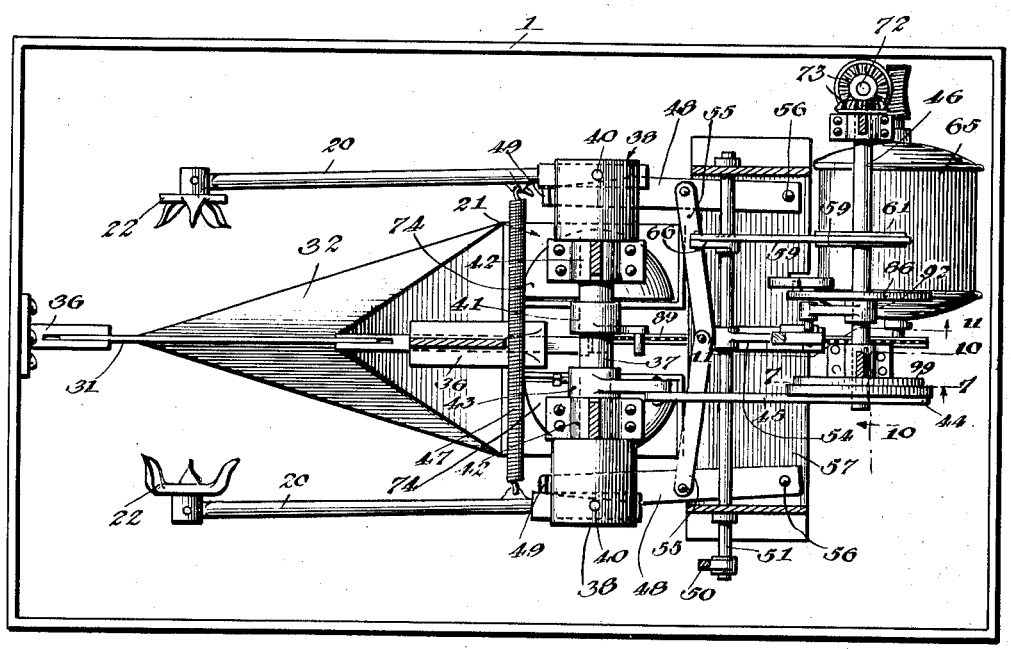

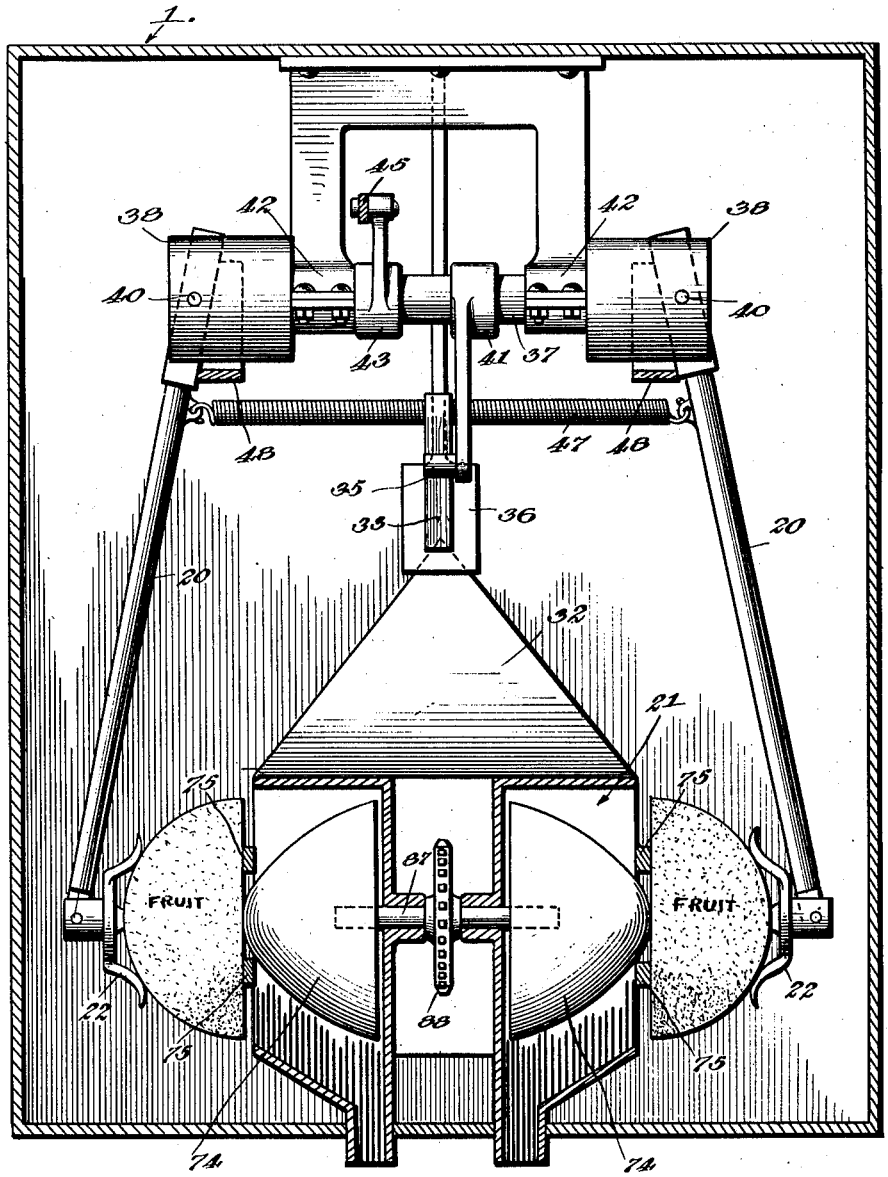

March 8, 1927.
G. N. HUGHES
1,620,551
FRUIT JUICE EXTRACTING MACHINE
Filed Aug. 3, 1925    6 Sheets-Sheet 6
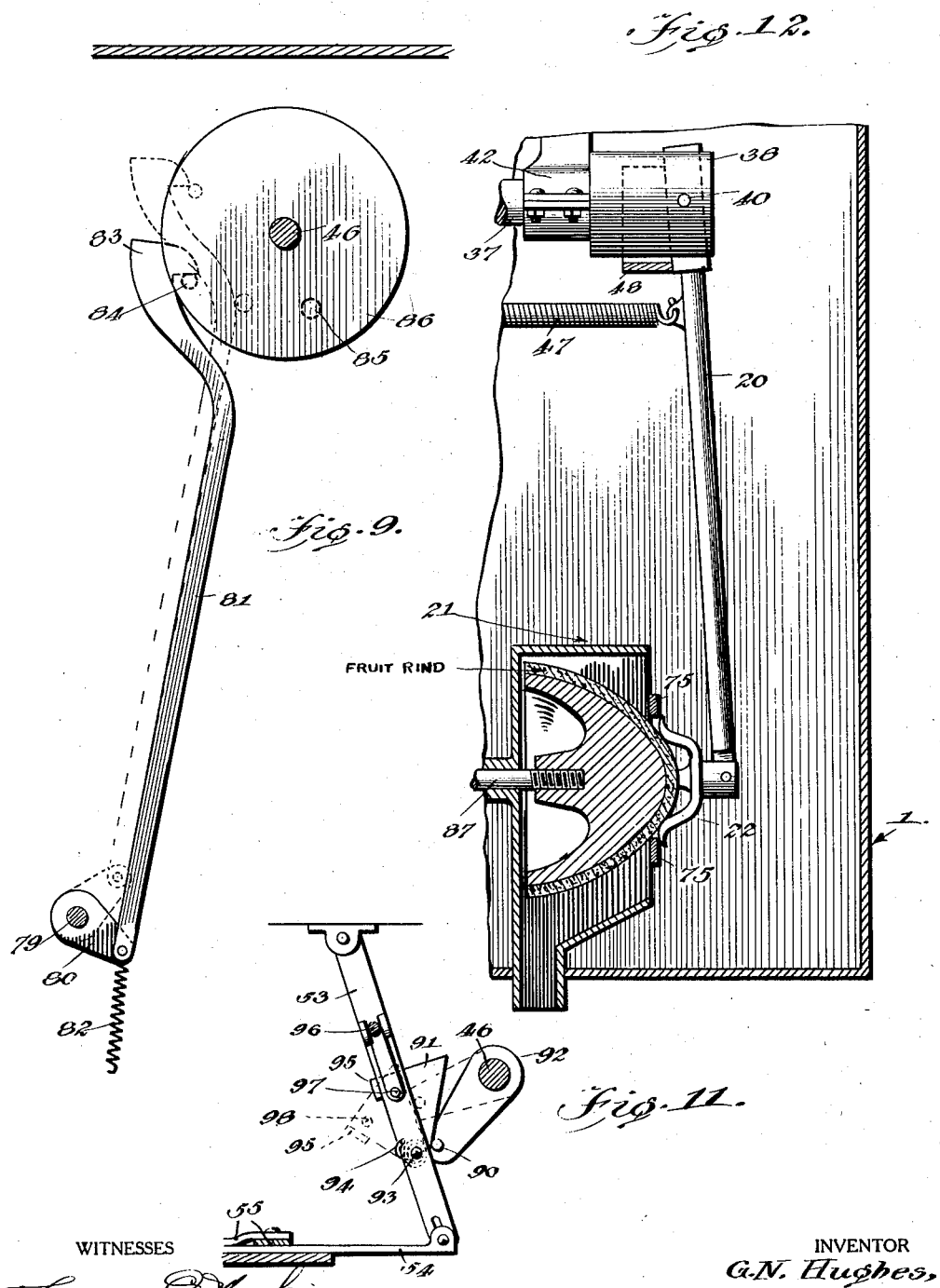
WITNESSES
INVENTOR
G.N. Hughes,
BY
ATTORNEYS Patented Mar. 8, 1927.

1,620,551

UNITED STATES PATENT OFFICE.

GUY N. HUGHES, OF ATLANTA, GEORGIA.

FRUIT-JUICE-EXTRACTING MACHINE.

Application filed August 3, 1925. Serial No. 47,899.

This invention relates to improvements in machines or apparatus for extracting juice from fruits, particularly citrus fruits, and consists of the constructions, combinations and arrangements herein described and claimed.

An object of the invention is to provide a machine carrying several kinds of fruit, for example oranges and lemons, between which the operator may make a selection prior to actuating the machine for the extraction of the juice from a selected fruit, the mechanism being such that after the selection has been made and the action of the machine initiated, such action continues until all of the juice has been extracted and rinds or hulls are expelled.

Another object of the invention is to provide a machine for the purpose described which is readily adaptable to a coin control so that it may be employed as a fruit juice vending machine.

Other objects and advantages appear in the following specification, reference being had to the accompanying drawings, in which—

Figure 2 is a detail sectional view, parts being in elevation, of the receptacle and hopper which handles the fruit.

Figure 3 is a detail vertical section taken on the line 3—3 of Figure 2.

Figure 4 is a detail fractional view of the selector by means of which one or the other of the two kinds of fruit may be discharged into the hopper.

Figure 5 is a perspective view illustrating the principal working parts of the machine, excepting the juice receptacle.

Figure 6 is a plan view of the machine, parts being in section.

Figure 7 is a section on the line 7—7 of Figure 6.

Figure 8 is a section on the line 8—8 of Figure 1, the grippers having drawn a half section of fruit into position at the grinder heads.

Figure 9 is a detail view of the retainer bar operating link and its associated pins.

Figure 10 is a detail cross section on the line 10—10 of Figure 6.

Figure 11 is a detail cross section on the line 11—11 of Figure 6 showing the cam pin and its associated parts.

Figure 12 is a detail section illustrating the manner of reengagement of the retaining bars with one of the empty fruit rinds.

Figure 1:
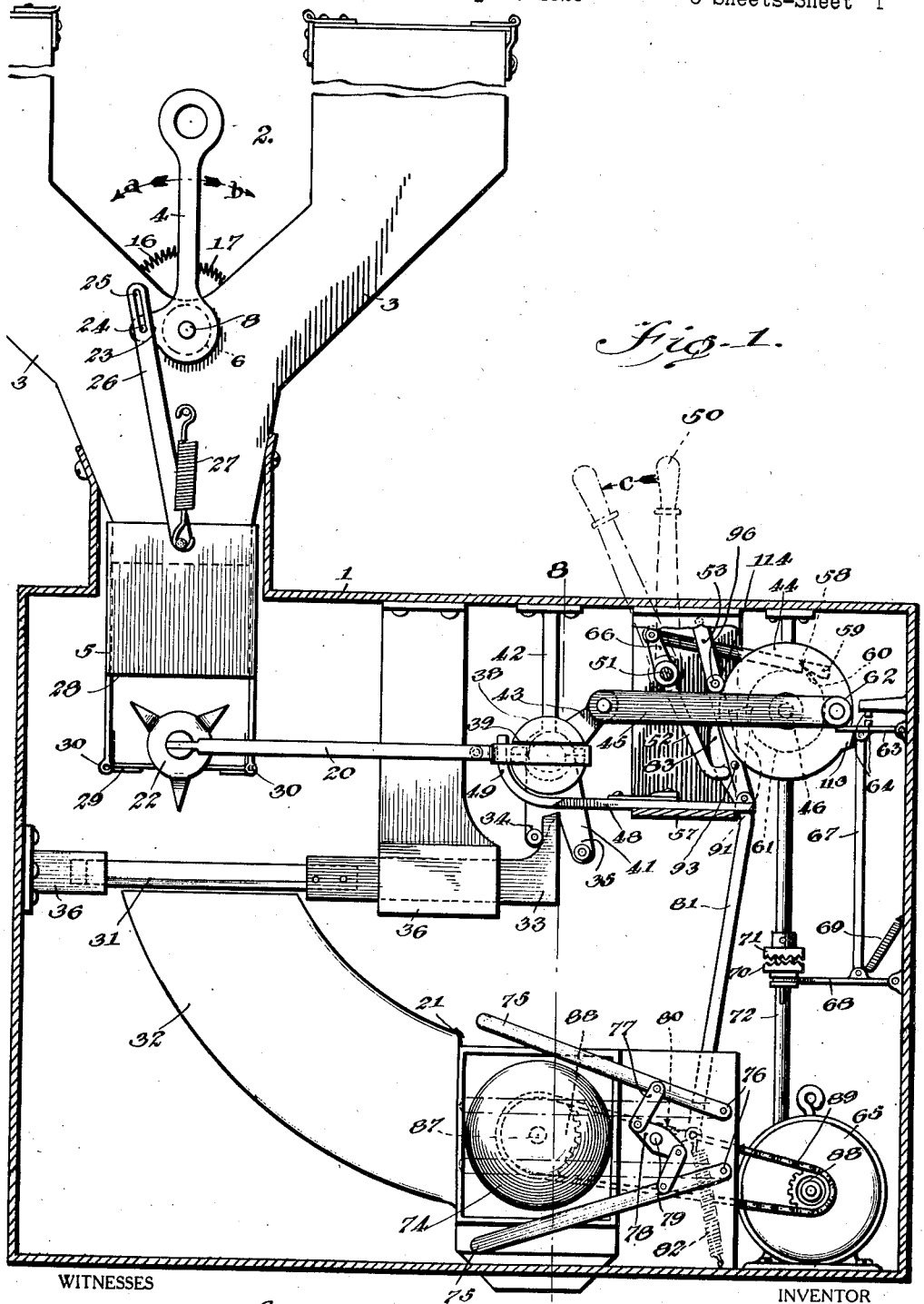
Figure 1 is a central section of the improved machine, parts being in side elevation, retainer arms being shown in dot and dash line position to receive a fruit.

In carrying out my invention, provision is made of a casing 1 which, to suit the needs of the invention shall be of such form and design as will appropriately house the mechanism and at the same time give the machine a pleasing and acceptable appearance. Mounted upon the casing 1 in any appropriate manner is a receptacle 2 which comprises a plurality of chutes 3 for the fruit. For illustration, the receptacle is shown to include two chutes, one for oranges O, the other for lemons L.

By moving the selector handle 4 (Figs. 1 and 2) in the direction of either arrow $a$ or $b$ the operator causes either an orange or a lemon to discharge into the hopper 5. The selector handle has a hub 6 (Fig. 3) which has bearing in the side of the chute 3. A complementary hub 7 has bearing in the opposite side of the chute. The two hubs are appropriately connected by a shaft 8 upon which the dividers 9 and 10 are loosely mounted for independent movement. Each divider comprises double flaps 11, 12 and 13, 14 which are normally held in the position in Figure 2 by the spring 15, the ends of which are mounted upon appropriate studs on the flaps 12 and 14.

Springs 16 and 17, slightly inferior in combined tension to the spring 15, bear between the selector handle 4 and appropriate studs on the flaps 11 and 13. The hub 6 has pins 18 and 19 which respectively engage the flaps 12 and 14. Upon movement of the handle 4 in the direction of the arrow $a$ (Fig. 2) the pin 18 depresses the flap 12 so that the divider or selector 9 is turned in the counterclockwise direction causing the liberation of the first orange pocketed between the flaps 11 and 12. The upper flap 11 moves down into the path of the orange next highest preventing the escape thereof, the spring 16 acting as a check to prevent that orange from entering behind the flange 11.

The same movement of the handle 4 compresses the spring 15 against the flap 14 of the divider or selector 10. This merely has the effect of holding the flap 13 against the upper wall of the chute 3 at the right. The pin 19 simply departs from the flap 14 and takes no part in the particular operation involved. Upon moving the handle 4 in the direction of the arrow $b$ the pin 19 will cause the same action of the divider 10 as did the pin 18 in respect to the divider 9, the difference being that a lemon L is liberated instead of an orange.

Upon liberation of either an orange O or lemon L into the hopper 5 it becomes the function of a pair of main arms 20 to transport the particular fruit to the juice extractor 21. Each arm has a gripper 22 to firmly hold the fruit. The grippers normally occupy predetermined positions in respect to the hopper 5, and inasmuch as there is a noticeable difference between the diameter of an orange O and a lemon L provision is made for moving the hopper 5 so that the larger fruit may be appropriately centered between the grippers.

An extension 23 on the left side of the hub 6 (Fig. 2) has a pin 24 that works in the slot 25 of a link 26 connected at the lower end to the hopper 5. A spring 27 provides means to normally hold the hopper 5 up. The arrangement just described is duplicated on the far side of the chute 3, this being necessary to provide for uniformity of motion. Upon movement to the left of the handle 4 (see arrow $a$) the pin 24 presses down upon the link 26 causing the hopper 5 to move down approximately to the dotted line position in Figure 2 thereby to center the liberated orange O in respect to the grippers. Upon movement of the handle 4 to the right (arrow $b$) the pin 24 merely rides up in the slot 25 and has no effect upon the hopper 5 because the grippers 22 are normally in position to receive a lemon.

Openings 28 at the sides of the hopper 5 make room for the action of the grippers upon a fruit. The lower end of the hopper carries a pair of gates 29 which are readily opened by action of the transporting arms 20 but have sufficiently strong springs 30 (Fig. 3) to keep them substantially closed when the weight of fruit is imposed thereon. It is intended that the gates shall open slightly when the fruit falls thereon, as shown in Figure 2.

Upon being taken out of the hopper 5 by the main arms 20 the fruit first comes in contact with a knife 31 which is given a sliding movement toward the right (Figs. 1 and 5) in consonance with the downward movement of the arms. The fruit is thus divided or cut in half, the halves passing along the sides of a separator 32. The separator is of diverging formation, the upper end being sharp, the sides spreading out to the lateral dimension of the juice receiver 21. The knife 31 has a heel 33 which in one instance is engaged at one side by a roller 34, and in another instance on the opposite side by a roller 35. These cause sliding of the knife first to the right when the arms move down and to the left when they return. Appropriate guides 36 support the knife.

A shaft 37 carries hubs 38 in slots 39 of which the arms 20 are pivotally mounted at 40, and also carries a bracket 41 by which the rollers 34 and 35 are supported. This shaft is supported by bearings 42. It carries an arm 43 which has connection with the crank disk 44 through the link 45. The crank disk is carried by a cam shaft 46, and it is by means of the crank disk that the main arms are moved through 90° from the original position at the hopper 5 to the final position at the juice receiver 21.

Prior to such movement of the arms 20 they occupy what is termed a normally open position (Fig. 6). A spring 47, connected between the arms, tends to close them. This tendency is resisted by spreader bars 48, the curved ends 49 of which occupy such positions beside the arms that the arms are normally held open, as stated, against the tension of the spring 47.

Movement of the starting handle 50 from the original and dotted line position in Figure 1 in the direction of arrow $c$ to the dot and dash line position turns the handle shaft 51 so that the pusher 52 carried thereby rocks the latch arm 53 to thereby pull upon the slider 54 and cause movement of the spreader bars 48 toward each other. This is accomplished by the connection of the slider with toggles 55. The toggles are pivoted at 56 and the pivot slides in a slot in the frame 57 which provides a support for a number of elements as seen in Figure 5.

The foregoing action attending the moving of the starting handle to the left relieves the support of the curved ends 49 against the arms 20 so that the spring 47 causes closure of the arms (Figs. 5 and 7) whereupon the grippers engage the fruit. This being accomplished, the operator moves the starting handle 50 to the right toward the original position, whereupon the recess 58 of the ratchet link 59 engages the tooth 60 of a disk 61 on the cam shaft 46 causing turning of the cam shaft in a clockwise direction sufficiently far to move the shoulder 62 of the link 45 past the contactor 63. The contacts 64 then engage, closing the electrical circuit (not shown) of the motor 65, the operation of which completes the action initiated by the starting handle.

The ratchet link 59 is pivotally attached to an arm 66 of the handle shaft 51. The ratchet link remains in contact with the periphery of the tooth disk 61 by gravity. The contactor 63 is pivotally mounted upon the casing. It has connection, by means of a link 67 with the clutch fork 68. The spring 69 tends to engage both the contacts 64 and the elements 70 and 71 of a clutch. The latter is fixed upon the drive shaft 72 which has a gear connection at 73 (Fig. 5) with the cam shaft 46. Starting of the motor 65, as stated, causes rotation of the cam shaft, turning of the crank disk 44, movement to the left of the link 45 and movement of the arms 20 from the horizontal position in Figure 1 to such position when the grippers 22 stand opposite to the revoluble heads 74 of the juice receiver.

Upon arrival of the half sections of fruit at opposite sides of the juice receiver 21 the half sections ride upon retainer bars 75 which are then in the closed position (dot and dash lines in Fig. 1). These bars normally stand open or separated as shown by full lines in Figure 1. They are pivoted at one end at 76, and are connected by means of links 77 with a double crank 78 on the arm shaft 79. The arrangement is duplicated on each side of the grinding heads 74. The arm shaft has an extension 80 to which one end of a retainer arm 81 is pivoted. A spring 82 attached at the pivotal connection tends to normally turn the shaft 79 in the clockwise direction thereby to separate the bars 75. The upper end of the link 81 is curved and terminates in a heel 83 which is engaged by a lift pin 84 while in the full line position (Fig. 9) and carried to the dotted line position whereat the heel is released.

Movement of the heel from the pin 84 is accomplished by a second pin 85 (Fig. 9) which at the appropriate time engages the curvature of the link and causes the function mentioned. Both pins are carried by a disk 86 on the cam shaft 46.

As soon as the heel is released, as stated, the retaining bars 75 return to the original full line position (Fig. 1) whereupon the spring 47 pulls the main arms 20 toward each other and draws the fruit half sections against the revolving heads 74 (Fig. 8), so that the pulp is macerated and the juice flows out. To this end the surfaces of the heads may be roughened in any desired manner. The heads are carried by a shaft 87 which is rotated by the motor 65 through appropriate sprocket and chain connections 88 and 89. The heads do not revolve until the motor starts.

After a determined interval of time has elapsed, during which interval the juice is removed from the fruit, the spreader bars 48 are opened causing rocking of the main arms 20 upon their pivots 40 and the withdrawal of the grippers 22 from the revolving heads 74. This is accomplished by the engagement of cam pin 90 with a latch 91 on the latch arm 53 (Figs. 1, 5 and 11). The latch arm 53 was moved into the position shown when the starting handle 50 was shifted to the left. The cam pin 90 is carried by an arm 92 on the cam shaft 46. The latch 91 is pivoted upon the arm 53 at 93, a spring 94 being incorporated in the pivot to keep the stop 95 in normal engagement with the arm. A crank 96 pivoted upon the arm 53 carries a pin 97 which normally engages a hole 98 (Fig. 11) in the latch thereby to lock the latch in the forward position. The aforesaid engagement of the cam pin 90 with the now locked latch 91 rocks the arm 53 to spread the bars 48 and disengage the grippers 22 from the fruit rinds.

At the same time the retaining bars 75 close again this time upon the empty fruit rinds, to prevent the rinds from sticking to the grippers. The position of the retaining bars in respect to the empty fruit rind on one side is shown in Figure 12. The action is accomplished by the lift pin (Fig. 9) with the heel 83 of the link 81. The resulting motion rocks the arm shaft 79 and closes the bars 75. The release pin 85 acts to displace the link 81 from the pin 84 permitting the spring 82 to reopen the bars 75 whereupon the fruit rinds (being free) drop out by gravity into a suitable receptacle (not shown).

The reengagement of the heel 83 of the link 81 by the lift pin 84 requires the explanation that the cam shaft 46 makes two complete revolutions to a cycle of operation of the machine. The pin disk 86 being fastened to the shaft makes two revolutions with it and therefore causes the second lifting of the retainer link 81 for the closing of the retaining bars 75 as stated. The main arms 20 derive their motion from the cam shaft 46, but the transmission of the motion is interrupted so that the arms may rest at the juice receiver 21 for the expulsion of the pulp, whereupon they return to the original position (Fig. 1).

Situated beside the crank disk 44 is a cam wheel 99 (Figs. 6, 7 and 10). This wheel is keyed to the cam shaft 46 as at 100. The crank disk 44 is loose upon the shaft, and it is not until the dog 101 engages a pin 102 on the crank disk 44 that the crank disk turns with the cam shaft 46.

The dog 101 is pivoted upon the cam wheel 99 at 103. A spring 104 tends to keep the dog in normal engagement with an appropriate stop 105. The heel 106 has an inclined surface. A bracket 107 provides an entirely independent support for the release cam 108 which is periodically revoluble through 90° by a release pin 109 on back of the cam wheel 99. A suitable spring stop 110 prevents counter-rotation of the release cam. Two of the cam wings 111 are short, the other two 112 are long.

When one of the short wings 111 is in the lowermost position the dog 101 on the cam wheel 99 goes by without releasing the crank disk 44, the end of the dog then remaining in engagement with the pin 102 (Fig. 7). But upon the second half revolution of the cam shaft 46 the release pin 109 on back of the wheel 99 will engage and turn the release cam 108 through 90° bringing one of the long wings 112 in the lowermost position (Fig. 7) so that when the dog 101 attempts to pass, the inclined heel 106 will ride over the long wing and so rock the dog upon its pivot 103 that the pin 102 becomes released and thereby stopping the crank disk 44.

The cam wheel 99 makes a complete revolution when the release pin 109 again turns the cam 108 through 90° then bringing a short wing 111 in lowermost position, thereby permitting the dog 101 to again engage the pin 102 and carry the crank disk 44 through a half revolution, at the end of which act the main arms 20 will be found in the original horizontal position and the contactor 63 will have been disengaged to open the motor circuit and automatically stop the motor.

Mention is made of the action of the cam pin 90 (Figs. 5 and 11) as pushing back upon the latch 91 and arm 53 to open the spreader bars 48 and separate the main arms 20 preparatory to the release of the fruit rinds at the receiver 21. Inasmuch as the cam shaft 46 makes two complete revolutions the tendency would be to spread the main arms twice whereas once is sufficient for the purpose of the machine.

In fact the arms 20 are not spread until the instant prior to their return to the normal position on the last half revolution of the cam shaft 46. It is then that the pin 97 locks the latch 91 so that the cam pin 90 may rock the arm 53 as intended. But on the first passage of the cam pin 90 past the arm 53 the pin 97 is displaced from the hole 98 in the latch 91 so that the latch merely rocks back on its pivot 93 by letting the pin 90 pass without affecting the arm 53. This function is accomplished by the engagement of a cam 113 with a roller 114 on the crank 96. The cam is carried by the cam wheel 99, and is so positioned thereon that the engagement of the roller 114 will occur at the appropriate time; substantially at the end of the first half revolution of the cam shaft 46.

The operation may be reviewed to advantage. When ready for operation, the starting handle 50 stands in the upright position (dotted lines in Figures 1 and 5). The main arms 20 are spread (Fig. 6). The left and right chute 3 (Fig. 2) contains oranges O and lemons L respectively, and the selector handle 4 stands in the central upright position.

The operator moves the selector handle in the direction of either arrow $a$ or $b$ (Figs. 1 and 2) depending on his choice of either an orange or a lemon. In the first instance the pin 18 (Fig. 2) rocks the divider or selector 9 so as to liberate an orange. In the second instance the pin 19 rocks the selector 10 to liberate a lemon. In the first instance the pin 24 bears down on the link 26 to lower the hopper 5 an appropriate distance to center the orange (which is the larger fruit) in respect to the grippers 22. In the second instance the pin 24 rides upward in the slot 25 and has no effect upon the hopper 5.

Move the starting handle 50 in the direction of the arrow $c$ (Figs. 1 and 5). The resulting turning of the handle shaft 51 causes the pusher 52 to rock the arm 53 so that it assumes the position in Figures 1, 5 and 11. The connected slider 54 pulls upon the toggles 55 so that the spreader bars 48 are drawn inwardly. This permits the spring 47 to draw the arms inwardly so that the grippers 22 engage the fruit at the open sides of the hopper. Next move the handle 50 in the reverse direction toward the original position. On this movement the ratchet link 59 engages the teeth 60 at the recess 58 and the manual effort at the handle turns the cam shaft 46 sufficiently far in the clockwise direction to move the shoulder 62 past the contactor 63. The spring 69 pulls upward causing engagement of the contacts 64 and the engagement of the clutch 70—71. The motor circuit being completed at the contacts 64 starts the motor and the operation initiated at the handle 50 is completed by the motor. The drive shaft 72 continues turning the cam shaft 46 in the clockwise direction.

The link 45 turns the shaft 37 through 90°, transporting the main arms 20 from the horizontal position in Figure 1 to the vertical position in Figure 8. It requires a half revolution of the crank disk 44 to accomplish this act, the normally loose crank disk being coupled to the cam wheel 99 at this time to accomplish the purpose. The reader must assume a short cam wing 111 (Fig. 7) to be in the lowermost position so that the passage of the cam wheel 99 will not affect the engagement of the dog 101 with the pin 102. It is this engagement that couples the crank disk 44 with the cam wheel, the pin 102 being carried by the disk 44.

At an appropriate time during the passage of the main arms 20 to the position in registration with the juice receiver 21, the normally open retaining bars 75 (Fig. 1) are closed to the dot and dash line position by the action of the lift pin 84 (Fig. 9) with the heel 83 of the retainer link 81. After the lifting act of the pin 84 has been accomplished the release pin 85 pushes the link 81 off of the pin 84 permitting the bars 75 to again open. But while they were closed the half sections of fruit carried by the grippers 22 slide upon the closed bars (Fig. 8) in readiness to be received by the grinding heads 74. After the half sections are in position the bars 75 open as stated, permitting the spring 47 to pull the fruit sections against the heads.

In consonance with the turning of the arm shaft 37 the roller 34 of the bracket 41 pulls the heel 33 of the knife 31 to the right, it being the resulting sliding motion of the knife 31 that cuts the fruit in half as the grippers 22 move the fruit downward. The separator 32 thereupon separates the fruit sections and they finally stop at the then closed bars 75 at which time the arms 20 stop in the upright position.

These acts represent a half revolution of the crank disk 44 with the cam wheel 99. The release pin 109 of the cam wheel then engages the release cam 108 giving it a 90° turn so that a long wing 112 comes into the lowermost position (Fig. 7). As soon as the dog 101 approaches the release cam the inclined heel 106 slides under the long wing rocking the dog on its pivot 103 and disengaging it from the pin 102 of the crank disk 104 so that the crank disk is caused to stop. The cam wheel 99 proceeds on its rotation and makes a complete revolution before the release pin 109 again actuates the cam 108 to bring the next short wing 111 into the lowermost position.

During this interval the spring 47 draws the fruit sections inwardly against the revolving grinding heads 74 so that the pulp is ground out leaving nothing but the empty rinds (Fig. 12). Approximately at the end of the first half revolution of the cam shaft 46, spoken of above, the cam pin 90 (Figs. 5 and 11) rides over the latch 91, but in order that this action shall not displace the arm 53 from its then inclined position, the cam 113 on the cam wheel 99 riding beneath the roller 114, rocking the crank 96 to displace the pin 97 on the latch 91 so that the riding thereover of the cam pin 90 will displace the latch to the dotted line position in Fig. 11. The arm 53 is not disturbed.

But at the end of the next full revolution of the cam shaft the displacement of the pin 97 by the cam 113 will be insured against so that the movement of the cam pin 90 against the now rigid latch 91 will swing the arm 53 to the left causing separation of the spreader bars 48 and separation of the arms 20 and grippers 22 from the now empty fruit rinds. Agreeable with this action the function of the lift pin 84 (Fig. 9) is repeated at the end of the full revolution spoken of, the action of the pin being to lift the link 81 and close the retaining bars 75 upon the empty rinds (Fig. 12) sufficiently long to permit the withdrawal of the grippers 22 without carrying the rinds with them. The opening of the bars 75 follows immediately, and the rinds drop out into a suitable receptacle.

The full revolution of the cam shaft 46, mentioned before having been accomplished and a short cam wing 111 now being in the lowermost position the resulting engagement of the dog 101 with the pin 102 causes the crank disk 44 to travel the next half revolution with the cam wheel 99. It is during this half revolution that the link 45 returns the main arms 20 and grippers 22 to the original horizontal position. The shoulder 62 engages the contactor 63 causing a separation of the contacts 64 and the stopping of the motor 65. The clutch 70 is disengaged at the same time and the machine stopped, having performed a complete cycle of operation. The roller 35 of the bracket 41 engages the right side of the heel 33 during the return of the arms 20 restoring the knife 31 to the original position.

It is recalled that moving the starting handle 50 from the normal upright position to the position at the left in the direction of the arrow c caused the pusher 52 to rock the arm 53 into the inclined position at the right. The arm 53 stays there until reversely moved by the action of the cam pin 90 against the rigid latch 91. Prior to this particular action the starting handle 50 is restored to the normal upright position, but this has no effect on returning the arm 53. The pusher 52 simply departs from the arm 53, leaving the arm in the inclined position until reversely actuated by the pin 90 as already stated.

It is also recalled that the cam 113 on the crank disk 44 rocks the crank 96 after the first half revolution of the crank disk has been performed. The latch 91 simply gives way when the pin 90 passes, the cam 113 and disk 44 remaining stationary during the interval and in fact for the next complete revolution of the cam shaft 46 and cam pin 90. At this time the crank disk 44 will be picked up by the dog 101, displacing the cam 113 from beneath the roller 114 in time to permit connection of the latch 91 with the arm 53 by the pin 97 so that the next transit of the cam pin 90 functions to rock the arm 53 back to separate the arms 20 preparatory to the release of the empty rinds.

The reader will understand that in order to make use of the commercial possibilities of the juice extracting machine it will have to be provided with a coin control so that by the insertion of an appropriate coin, the vendee can cause operation of the machine to produce the particular fruit juice required. But the coin control is omitted herein, inasmuch as it will require a particular construction, itself being another subject matter of invention.

While the construction and arrangement of the improved juice extracting machine is that of a generally preferred form, obviously modifications and changes may be made without departing from the spirit of the invention or the scope of the claims.

I claim:—

1. A juice extracting machine comprising a fruit hopper, a juice extractor having grinding heads, means gripping a whole fruit at the hopper and transporting it to said extractor, means for cutting the fruit in half and separating the halves during transportation, means temporarily positioned in front of said grinding heads to receive said halves upon arrival at the juice extractor, and means acting on the transporting means to urge the halves onto the grinding heads upon displacement of said temporarily positioned means thereby to remove the pulp.

2. A juice extracting machine comprising a fruit hopper, a juice extractor having grinding heads, retaining bars associated with said grinding heads, means to grip a whole fruit at said hopper and transport it to the extractor, means to cut the fruit in halves during transportation and cause it to separate as the extractor is reached, and means to first move the retaining bars to position in front of the grinding heads to receive the halves and then reversely move the bars to permit action of the grinding heads upon the pulp.

3. A juice extracting machine comprising a fruit hopper, a juice extractor having grinding heads, retaining bars associated with said grinding heads, means to grip a whole fruit at said hopper and transport it to the extractor, means to cut the fruit in halves during transportation and cause it to separate as the extractor is reached, means to first move the retaining bars to position in front of the grinding heads to receive the halves and then reversely move the bars to permit action of the grinding heads upon the pulp, and means including a spring associated with said transporting means to continuously draw the halves toward the grinding heads until all of the pulp is ground out.

4. A juice extracting machine comprising a fruit hopper, a juice extractor, means for transporting a fruit from the hopper to the extractor, means to impart motion to said transporting means, a knife in the path of the fruit, and means utilizing the motion imparted to said transporting means to slide the knife and thereby cut the fruit in half as it passes.

5. A juice extracting machine comprising means capable of predetermined angular motion to transport a fruit from a receiving to a juice-extracting position and then return, means by which the necessary active and idle movements are imparted to the transporting means, a knife situated in the path of the fruit, and means to slide the knife in one direction upon the active movement of the transporting means thereby to cut the fruit in half and slide the knife in the reverse direction to the original position upon the idle movement of said transporting means.

6. A juice extracting machine comprising arms for transporting a fruit from a receiving to a juice-extracting position, a shaft carrying said arms, means to turn the shaft first in one then the other direction to move said arms through active and idle strokes, a knife in the path of the fruit having a heel associated therewith, and means carried by the shaft engaging the heel at each turn of the shaft to first slide the knife to cut the fruit then return the knife, said means including a pair of rollers engageable with opposite sides of the heel alternately.

7. A juice extracting machine comprising pivoted arms for transporting a fruit from a receiving to a juice-extracting position, means normally tending to pull said arms toward each other, grippers carried by said arms, and means normally holding said arms apart to resist said pulling tendency but being operable to permit said pulling means to swing the arms together and grip a fruit at the receiving position.

8. A juice extracting machine comprising a hopper having open sides, pivoted arms to transport a fruit from a receiving to a juice-extracting position including grippers normally stationed at said open sides, means for discharging a fruit into the hopper to be received by said grippers, means including a spring normally tending to draw the arms together, and means engaging the arms to normally release said spring, said means being movable to release the arms and permit drawing together by said spring so that said grippers engage the fruit at said open sides.

9. A juice extracting machine comprising a fruit receptacle, an open-sided hopper, pivoted arms having grippers normally stationed at said open sides, means engaging the arms to hold the grippers in a predetermined receiving position, means to liberate a fruit from the receptacle for discharge into the hopper ready to be received by the grippers, and means including a spring drawing the arms together, said grippers engaging the fruit upon release of the arms by said engaging means.

10. A juice extracting machine comprising a receptacle for a plurality of kinds of fruit, a single open-sided hopper, pivoted arms having grippers normally stationed at said open sides, selector means for liberating a desired kind of fruit for discharge into the hopper, means engaging the arms holding the grippers open thereby permitting admission of the fruit therebetween, means including a spring normally tending to draw the arms together, and means displacing said engaging means permitting the spring to draw said arms together and the grippers into engagement with the fruit.

11. A juice extracting machine comprising a receptacle for a plurality of kinds of fruit of different sizes, a single open-sided hopper, arms having grippers stationed in a predetermined position at said open sides, means engaging the arms holding the grippers separated to receive a fruit, selector means for liberating a desired fruit for discharge into the hopper, and associated means for adjusting the hopper in respect to the grippers so that a fruit of variable diameter may be centered in respect to the grippers, means including a spring connected with the arms, and means for releasing said engaging means permitting the spring to draw the arms together so that the grippers engage the fruit.

12. A juice extracting machine comprising a receptacle for fruit of different sizes, grippers occupying a normal receiving position, a hopper into which the fruit is discharged preparatory to reception by the grippers, selector means for liberating one or the other kind of fruit for discharge into the hopper, and associated means for appropriately moving the hopper when the larger size of fruit is liberted thereby to insure separating said fruit in respect to the grippers.

13. A juice extracting machine comprising a receptacle for two kinds of fruit of different size, grippers, a hopper into which fruit is discharged prior to reception by the grippers, selector means for liberating one or the other kind of fruit for discharge into the hopper, and associated means for lowering the hopper in respect to the grippers when the larger size of fruit is liberated thereby to center said larger fruit in respect to the grippers.

14. A juice extracting machine comprising a receptacle for fruit of two different sizes, grippers, a hopper into which the fruit is discharged preparatory to reception by the grippers, selector means including a pair of dividers, a selector handle having means including a pair of pins for actuating one or the other divider liberating one or the other kind of fruit depending on the direction in which the handle is moved, a slotted link extending from the hopper to the handle, and a pin carried by the handle operable in the slot to merely ride therein when the handle is moved in one direction to liberate the smaller size of fruit but depressing the link to lower the hopper when the handle is moved in the other direction to liberate the larger size of fruit thereby to center the larger fruit in respect to the grippers.

15. A juice extracting machine comprising a pair of arms having fruit grippers, a shaft to support the arms, hub on the shaft having slots in which arms are pivotally mounted, means including a spring tending to draw the arms together, pivoted spreader bars engaging the arms, and means to actuate the spreader bars to either cause separation of the arms against the tension of the spring or permit said arms to move toward each other by virtue of said spring.

16. A juice extracting machine comprising a pair of arms having grippers, a shaft supporting the arms, hubs on the shaft having slots in which the arms are pivotally mounted, a spring connecting the arms and tending to draw them together, pivoted spreader bars having rounded ends extending around the hubs and adjacent the arms on the inside, and means including toggles for actuating the spreader bars upon their pivots to either separate the arms against the tension of said spring or permit movement of said arms toward each other by virtue of said spring.

17. A juice extracting machine comprising a pair of arms having grippers, means including spreader bars holding the arms separated, normally dormant mechanical means for moving said arms from a fruit receiving to a juice extracting position, a starting handle having means for initially actuating said spreader bars to release said arms prior to the action of said mechanical means, and a frame drawing the arms together causing engagement of the grippers with a fruit in the receiving position.

18. A juice extracting machine comprising a pair of arms having grippers, means including spreader bars normally holding the arms separated to receive the fruit between the grippers, normally dormant mechanical means for moving the arms from a receiving to a juice extracting position, a manual starting handle, means actuated by the handle upon movement in one direction causing the spreader bars to release the arms, a spring then drawing the arms together so that the grippers engage a fruit then in position, and means actuated by the starting handle upon movement in another direction to initiate the movement of the arms and start said mechanical means thereby to complete said movement to the juice extracting position.

19. A juice extracting machine comprising arms having fruit grippers, a starting handle, means which upon one movement of the starting handle permits closure of the arms to grip a fruit, mechanical means including a cam shaft for moving the arms to a juice extracting position, an electric motor having a shaft to drive the cam shaft and including a clutch, contacts controlling energization of the motor, and means for initiating the turning of the cam shaft upon another movement of the starting handle thereby to close the contacts and engaging the clutch to complete the movement of the arms and grippers to the juice extracting position.

20. A juice extracting machine comprising arms having fruit grippers, a cam shaft having means by operation of which upon turning of the shaft the arms are transported from a fruit receiving to a juice-extracting position, a starting handle having means which by movement of the handle initiates the turning of the cam shaft, an electric motor having a driving connection with the cam shaft, and electrical contacts controlling the motor caused to engage upon said movement of the handle after initiation of the turning of the cam shaft to energize the motor to continue turning of the cam shaft for the purpose described.

21. A juice extracting machine comprising arms having fruit grippers, a cam shaft having means by operation of which upon turning of the shaft the arms are transported from a fruit receiving to a juice-extracting position, a starting handle having means which by movement of the handle initiates the turning of the cam shaft, an electric motor having a driving connection with the cam shaft, and electrical contacts controlling the motor caused to engage upon said movement of the handle after initiation of the turning of the cam shaft to energize the motor to continue turning of the cam shaft for the purpose described, and means becoming operative after a predetermined turn of the cam shaft to leave the arms idle in the juice extracting position when the cam shaft continues to turn.

22. A juice extracting machine comprising arms having fruit grippers, a cam shaft having means by operation of which upon turning of the shaft the arms are transported from a fruit receiving to a juice-extracting position, a starting handle having means which by movement of the handle initiates the turning of the cam shaft, an electric motor having a driving connection with the cam shaft, electrical contacts controlling the motor caused to engage upon said movement of the handle after initiation of the turning of the cam shaft to energize the motor to continue turning of the cam shaft for the purpose described, and means associated with the cam shaft becoming operative to leave the arms idle in the juice-extracting position while the cam shaft continues to turn causing reverse movement of the arms from the juice-extracting to the original position.

23. A juice extracting machine comprising revoluble grinding heads, arms having grippers, means including a cam shaft for moving the arms to transport half sections of fruit held by said grippers into position in front of said heads, retaining bars normally positioned in front of said heads to preliminarily receive said half sections, and means actuated upon turning of said cam shaft to displace said bars permitting engagement of said half sections with the grinding heads for acting upon the pulp.

24. A juice extracting machine comprising revoluble grinding heads, arms having grippers to hold half sections of fruit, a cam shaft having means to move the arms and transport the half sections to said heads, retaining bars in front of the heads to normally receive said half sections, a link for actuating the bars having a curved portion and a heel, a disk on the cam shaft having a pin engageable with the heel to actuate the link and open the retaining bars thereby to permit engagement of the half sections with the heads, and a second pin on said disk being engageable with the curved portion of the link to disengage the heel from said first pin and permit the return of said bars.

25. A juice extracting machine comprising arms having fruit grippers and being movable to a juice-extracting position, a turnable cam shaft, means connecting said shaft with said arms for the foregoing function, an electric motor having a drive shaft to turn the cam shaft, electrical contacts controlling said motor, a disk on said shaft having a tooth, a starting handle having a ratchet link engageable with the teeth upon appropriate movement of the starting handle whereby to initiate the turning of the cam shaft and the movement of said arms and means then causing closure of said contacts for the energization of the motor continuing the turning of the cam shaft and completing the movement of said arms.

26. A juice extracting machine comprising arms having grippers to transport sections of fruit to a juice extracting position, a revoluble cam shaft, means including a crank disk loose on the crank shaft and having connection with said arms, means including a dog for coupling the cam shaft with the crank disk thereby to carry said arms to a predetermined arc of movement, and means to then actuate the dog and uncouple the crank disk thereby to leave said arms idle at the end of said movement.

27. A juice extracting machine comprising arms having fruit grippers, a revoluble cam shaft, a crank disk loosely mounted on the cam shaft, means including a link and arms connecting the crank disk and arms, coupling means including a dog being continuously revoluble with the cam shaft, means including a pin carried by the crank disk being engageable by the dog, and means including a release cam for periodically acting upon the dog causing coupling and uncoupling thereof with said crank disk pin thereby producing intermittent movement of said gripper arms while the cam shaft rotates continuously.

28. A juice extracting machine comprising arms having grippers to carry fruit, a continuously revoluble cam shaft carrying a cam wheel, a crank disk loose on the crank shaft, a connection between the crank disk and gripper arms, a dog carried by the cam wheel, a pin on the crank disk being engageable by the dog to couple the crank disk to the cam shaft and move the gripper arms through a predetermined arc, a release cam having long and short wings respectively causing disengagement and engagement of the dog with the pin, and means including a pin carried by the cam wheel periodically engageable with the cam alternately bringing long and short wings into engagement with the dog rendering said dog inoperative alternately and producing an intermittent movement of said gripper arms.

29. A juice extracting machine comprising pivoted arms having a connecting spring tending to pull them into a fruit-gripping position, a cam shaft having connecting means for moving the arms to a fruit juice-extracting position, a pivoted arm having associated bars normally holding said gripper arms in one of said positions, a starting handle having a pusher for displacing the pivoted arms upon movement in one direction thereby actuating said spreader bars to permit closure of the gripper arms prior to said movement, a pivoted latch carried by the pivoted arms, a cam pin turnable with the cam shaft into the path of which said latch is extended upon displacement of the pivoted arm, means including a crank and pin for locking the latch in position upon the pivoted arm, and means associated with the cam shaft which upon such turning of the cam shaft as will move said gripper arms to the extracting position causes rocking of the crank and unlocking of the latch permitting passage of the cam pin without affecting the pivoted arm, thereby leaving the gripper arms closed while in said position.

GUY N. HUGHES.